US012442314B2

(12) United States Patent
Piazza (10) Patent No.: US 12,442,314 B2
(45) Date of Patent: Oct. 14, 2025

(54) LUBRICATION SYSTEM FOR A TURBINE ENGINE

(71) Applicant: GE Avio S.r.l., Rivalta di Torino (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/751,966

(22) Filed: Jun. 24, 2024

(65) Prior Publication Data

US 2025/0116206 A1 Apr. 10, 2025

(30) Foreign Application Priority Data

Oct. 10, 2023 (IT) .................. 102023000021060

(51) Int. Cl.
*F01D 25/20* (2006.01)
(52) U.S. Cl.
CPC ...... *F01D 25/20* (2013.01); *F05D 2260/4031* (2013.01); *F05D 2260/43* (2013.01)
(58) Field of Classification Search
CPC .......... F01D 25/20; F01D 15/10; F01D 15/08; F01D 25/18; B64D 2041/005; F02C 7/32; F05D 2220/76; F05D 2240/50; F05D 2220/323; F05D 2220/36; F05D 2260/98
See application file for complete search history.

(56) References Cited

U.S. PATENT DOCUMENTS

| 1,447,313 | A | * | 3/1923 | Macdonald | ............. F01M 1/06 184/6.5 |
| 1,714,921 | A | * | 5/1929 | Parrish | .................... F16N 13/10 184/32 |
| 2,168,122 | A | * | 8/1939 | Gausmann | ............. F04B 53/16 184/6.16 |

(Continued)

FOREIGN PATENT DOCUMENTS

| CN | 113202632 A | 8/2021 |
| CN | 113898526 A | 1/2022 |

(Continued)

OTHER PUBLICATIONS

Van De Ven, "Increasing Hydraulic Energy Storage Capacity: Flywheel-Accumulator," International Journal of Fluid Power 10, No. 3., pp. 41-50 (2009).

*Primary Examiner* — Henry Y Liu
(74) *Attorney, Agent, or Firm* — Venable LLP; Peter T. Hrubiec; Michele V. Frank (57) ABSTRACT

A lubrication system for a turbine engine. The turbine engine includes a propulsor and one or more rotating components. The lubrication system includes a sump, a primary lubrication system, an auxiliary lubrication system, and a kinetic energy storage system. The sump stores lubricant therein. The primary lubrication system supplies the lubricant from the sump to the one or more rotating components during normal operation of the turbine engine. The auxiliary lubrication system includes an auxiliary pump including an auxiliary pump shaft. The kinetic energy storage system (Continued)

includes a flywheel that engages the auxiliary pump shaft to power the auxiliary pump when the propulsor is windmilling such that the auxiliary pump pumps the lubricant from the sump to the one or more rotating components.

20 Claims, 4 Drawing Sheets

(56) References Cited

U.S. PATENT DOCUMENTS

| | | | | |
|---|---|---|---|---|
| 2,612,958 | A * | 10/1952 | Richardson | B64C 11/42 60/431 |
| 2,974,730 | A * | 3/1961 | Voisard | B64C 11/385 416/46 |
| 4,007,892 | A * | 2/1977 | Tabor | B64D 27/00 60/761 |
| 4,928,553 | A * | 5/1990 | Wagner | F16H 33/02 475/329 |
| 7,662,059 | B2 * | 2/2010 | McCune | F01D 25/20 184/6.12 |
| 7,834,471 | B2 * | 11/2010 | Cripps | F03G 1/026 290/1 R |
| 7,849,668 | B2 * | 12/2010 | Sheridan | F01D 25/20 384/473 |
| 7,878,302 | B2 * | 2/2011 | Smith | F16N 17/02 184/6.11 |
| 7,883,438 | B2 | 2/2011 | McCune | |
| 8,230,974 | B2 * | 7/2012 | Parnin | F01D 25/18 184/6.11 |
| 9,840,969 | B2 * | 12/2017 | Sheridan | F16H 1/48 |
| 9,903,227 | B2 * | 2/2018 | Cigal | F01D 25/18 |
| 10,107,135 | B2 * | 10/2018 | Schwarz | F02C 3/04 |
| 10,145,276 | B2 * | 12/2018 | Parnin | F01M 11/10 |
| 10,208,624 | B2 * | 2/2019 | Duong | F02C 3/107 |
| 10,221,770 | B2 * | 3/2019 | Sheridan | F02C 7/06 |
| 10,267,233 | B2 * | 4/2019 | Mastro | F02C 3/107 |
| 10,336,461 | B2 * | 7/2019 | Mackin | F01D 15/10 |
| 10,513,949 | B2 * | 12/2019 | Parnin | F16H 57/0442 |
| 10,634,053 | B2 * | 4/2020 | Schwarz | F16H 57/0471 |
| 10,801,413 | B2 * | 10/2020 | Roberge | F02C 6/14 |
| 10,837,312 | B2 * | 11/2020 | Gates | F01D 5/06 |
| 11,092,037 | B2 * | 8/2021 | Valva | F01M 1/02 |
| 11,125,111 | B2 | 9/2021 | Mason et al. | |
| 11,125,167 | B2 | 9/2021 | Sheridan | |
| 11,174,797 | B2 * | 11/2021 | Gebhard | F02C 7/36 |
| 11,261,755 | B2 * | 3/2022 | Cornet | F02C 7/06 |
| 11,428,163 | B2 * | 8/2022 | Parnin | F01D 17/20 |
| 11,511,872 | B2 * | 11/2022 | Staubach | B64D 27/355 |
| 12,228,042 | B1 * | 2/2025 | Miller | F02C 7/06 |
| 12,276,333 | B2 * | 4/2025 | Miller | F16H 57/0436 |
| 12,291,998 | B2 * | 5/2025 | Gallagher | B64D 27/24 |
| 2006/0055175 | A1 * | 3/2006 | Grinblat | F03G 7/04 290/54 |
| 2008/0179886 | A1 * | 7/2008 | Rebsdorf | F03D 7/02 290/55 |
| 2012/0221157 | A1 * | 8/2012 | Finney | F02C 7/32 700/287 |
| 2013/0098059 | A1 * | 4/2013 | Suciu | F01D 15/08 60/783 |
| 2013/0195603 | A1 * | 8/2013 | Sheridan | F02C 3/107 415/18 |
| 2013/0319006 | A1 * | 12/2013 | Parnin | F02C 3/107 184/6.12 |
| 2014/0182972 | A1 * | 7/2014 | Hetherington | F02C 7/06 184/6.11 |
| 2016/0039371 | A1 * | 2/2016 | Blumer | B60L 50/10 290/31 |
| 2016/0208651 | A1 * | 7/2016 | Dolman | F16H 57/0475 |
| 2016/0258324 | A1 * | 9/2016 | Cigal | F01D 21/00 |
| 2016/0273540 | A1 * | 9/2016 | Mauvais | G21C 15/243 |
| 2019/0292944 | A1 * | 9/2019 | Mason | F01M 1/02 |
| 2020/0291817 | A1 * | 9/2020 | Leque | F01M 11/064 |
| 2022/0267021 | A1 * | 8/2022 | Zebian | F02C 7/14 |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 92/22747 A1 | 12/1992 |

* cited by examiner

FIG. 3

LUBRICATION SYSTEM FOR A TURBINE ENGINE

CROSS REFERENCE TO RELATED APPLICATIONS

The present application claims the benefit of Italian Patent Application No. 102023000021060, filed on Oct. 10, 2023, which is hereby incorporated by reference herein in its entirety.

TECHNICAL FIELD

The present disclosure relates generally to a lubrication system, for example, for a turbine engine.

BACKGROUND

Turbine engines generally include a propulsor (e.g., a fan) and a core section arranged in flow communication with one another. Some turbine engines include one or more rotating components that rotate. A lubrication system provides a lubricant to the one or more rotating components of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the core turbine engine such that rotation of the components of the core turbine engine causes the propulsor to rotate and to generate thrust. A propulsor can include a fan or a propeller. In turbofan engines or open fan engines, the propulsor is a fan. In turboprop engines, the propulsor is a propeller.

As used herein, "normal operation" of a turbine engine is intended to mean when the turbine engine is operating, and a primary lubrication system of the turbine engine is supplying lubricant to one or more rotating components of the turbine engine. Normal operation can include a mission cycle of the turbine engine after the turbine engine is powered on, including, for example, idle conditions, taxiing conditions, takeoff conditions, cruise conditions, descent conditions, or landing conditions.

As used herein, "windmill" or "windmilling" is a condition when the propulsor and the low-pressure shaft of the turbine engine continue to rotate at low speeds, while the high-pressure shaft rotates slowly or even stops. Windmilling can occur when the turbine engine is shut down, but air still flows across the propulsor, such as during an in-flight engine shutdown or when the turbine engine is on the ground and the propulsor is rotating in the presence of wind when the turbine engine is shutdown. During a shutdown, e.g., while the aircraft is on the ground, the propulsor may also rotate in either direction depending upon the stationary position of the turbine engine relative to the ambient wind. Airflow entering the propulsor exhaust may exit the propulsor inlet in an opposite direction as a direction of operation and cause the propulsor to rotate in an opposite rotational direction compared to the intended operational rotational direction.

As used herein, "active," "activate" or "activating" an auxiliary lubrication system includes causing lubricant to flow within the auxiliary lubrication system. For example, activating the auxiliary lubrication system includes powering an auxiliary pump to pump the lubricant through the auxiliary lubrication system.

As used herein, to "inactivate" an auxiliary lubrication system or an "inactive" auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a propulsor having a propulsor shaft. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more power gearbox bearings for a power gearbox assembly of the turbine engine. The one or more power gearbox bearings allow rotation of one or more power gearbox gears of the power gearbox assembly about the one or more power gearbox bearings. In one embodiment, one or more of the bearings are journal bearings. The one or more bearings can include any type of bearings, such as, for example, roller bearings, or the like. The lubrication system supplies a lubricant (e.g., oil) to the one or more rotating components. The lubrication system includes a sump that stores lubricant therein, and a primary lubrication system having a primary pump and a primary lubricant supply line. During normal operation of the turbine engine, the primary pump pumps the lubricant from the sump to the one or more rotating components through the primary lubricant supply line.

The bearings, especially journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary pumps may be drivingly coupled to the propulsor shaft and require added complexity for driving the auxiliary pump by the propulsor shaft. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the propulsor windmills in either direction (e.g., the propulsor rotates clockwise or counter-clockwise).

Accordingly, the present disclosure provides an auxiliary lubrication system that supplies the lubricant to the one or more rotating components during any time that the primary lubrication system is unable to supply the lubricant. In particular, the present disclosure provides for supplying lubricant to the one or more rotating components (e.g., journal bearings) when the turbine engine is shut down or whenever the turbine engine is windmilling to avoid journal bearing seizure. The present disclosure provides a kinetic energy storage system that stores kinetic energy during normal operation of the turbine engine. In particular, the kinetic energy storage system is drivingly coupled to an accessory gearbox of the turbine engine and activates when the turbine engine is shut down or is otherwise windmilling. The kinetic energy storage system powers the auxiliary pump by supplying the stored kinetic energy to the auxiliary pump when the turbine engine is shut down. The kinetic energy storage system includes a flywheel that is mechanically driven via speed increasing gears of the accessory gearbox. The flywheel rotates and stores kinetic energy by angular momentum of the flywheel. The kinetic energy storage system includes an electromagnetic clutch that engages the flywheel during normal operation of the turbine engine to prevent the flywheel from engaging the auxiliary pump. During normal operation, and, when the clutch is engaged, the flywheel is driven by the accessory gearbox and stores kinetic energy that is generated by the turbine engine (e.g., by rotation of the shafts of the turbine engine).

The clutch disengages the flywheel upon an active command (e.g., from a controller) or missing electrical power, and the flywheel moves by one or more flywheel springs to engage an auxiliary pump shaft to drive the auxiliary pump. The flywheel continues to rotate even though the flywheel is no longer engaged with the accessory gearbox due to the angular momentum of the flywheel (e.g., the stored kinetic energy). As the flywheel continues to rotate, the flywheel releases the kinetic energy and powers the auxiliary pump.

In this way, the auxiliary pump pumps the lubricant to the one or more rotating components (e.g., the bearings). The auxiliary pump can be a variable displacement pump such, that as the flywheel rotation slows down, the auxiliary pump increases the displacement of the lubricant such that the auxiliary pump pumps the lubricant at a constant mass flow rate even when the flywheel rotation slows.

Accordingly, the auxiliary lubrication system supplies lubricant to the one or more rotating components while the turbine engine is shut down or is otherwise windmilling. The kinetic energy storage system ensures that the auxiliary pump operates to pump the lubricant to the one or more rotating components independently of the rotational direction of the propulsor during windmilling (e.g., whether the propulsor is rotating clockwise or counterclockwise). The kinetic energy storage system also reduces complexity of the auxiliary lubrication system by powering the auxiliary pump independently of the propulsor shaft rotation or rotation of other shafts of the turbine engine.

Figure 1:
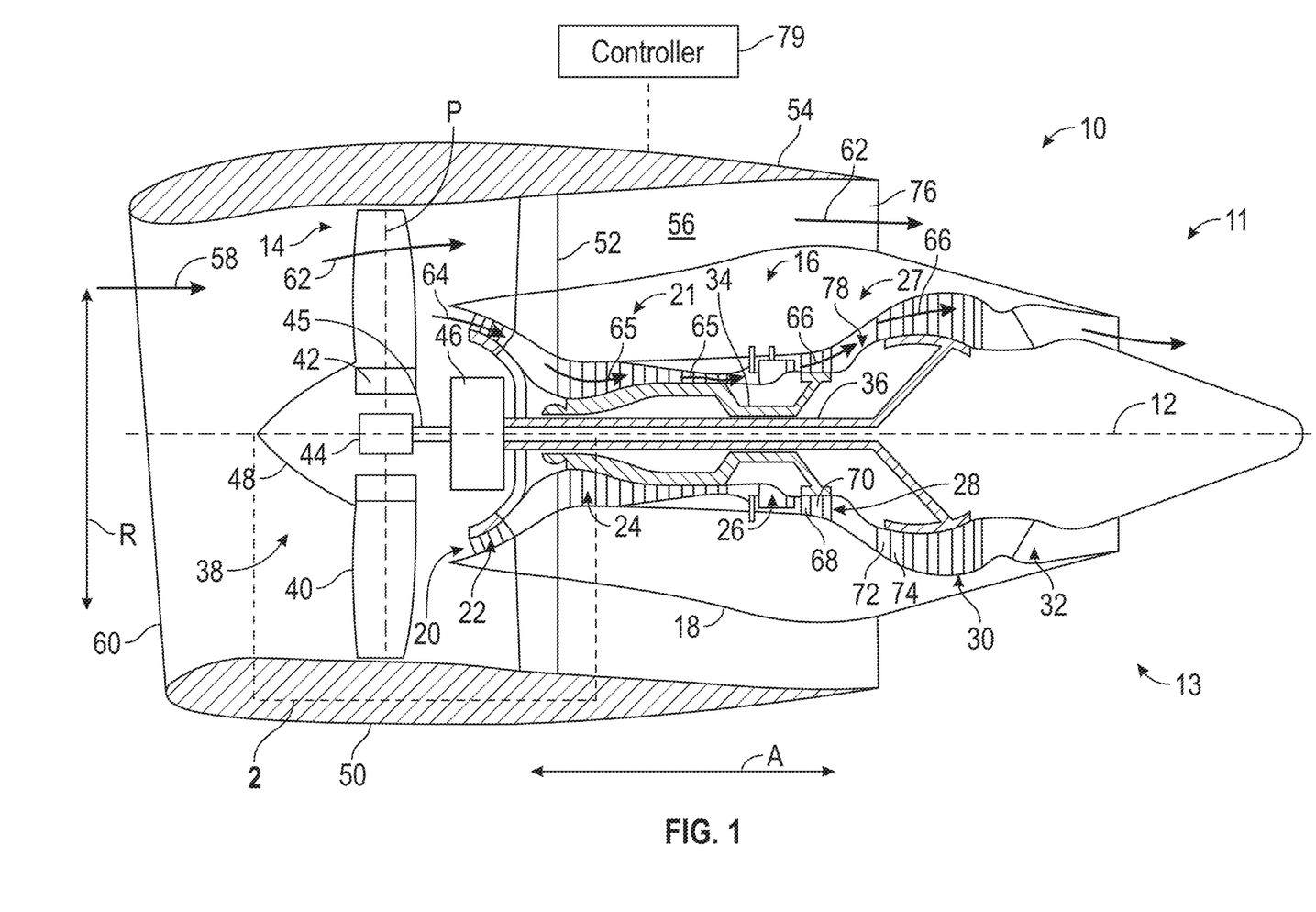
FIG. 1 is a schematic cross-sectional diagram of a turbine engine, taken along a longitudinal centerline axis of the turbine engine, according to the present disclosure.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13. In general, the turbine engine 10 includes a propulsor section 14 and a core turbine engine 16 disposed downstream from the propulsor section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The HP shaft 34, the LP shaft 36, or both the HP shaft 34 and the LP shaft 36 are supported by one or more engine bearings that allow the HP shaft 34 or the LP shaft 36 to rotate, as detailed further below. The compressor section 21, the combustion section 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the core turbine engine 16. In some embodiments, the propulsor 38 is a propeller that is driven by the core turbine engine 16. The propulsor blades 40 extend outwardly from the disk 42 generally along the radial direction R. Each propulsor blade 40 is rotatable relative to the disk 42 about a pitch axis P by virtue of the propulsor blades 40 being operatively coupled to an actuation member 44 configured to collectively vary the pitch of the propulsor blades 40 in unison, as detailed further below. The propulsor blades 40, the disk 42, and the actuation member 44 are together rotatable about the longitudinal centerline axis 12 via a propulsor shaft 45 that is powered by the LP shaft 36 across a power gearbox, also referred to as a power gearbox assembly 46. The power gearbox assembly 46 is shown schematically in FIG. 1. The power gearbox assembly 46 includes a plurality of power gearbox gears for adjusting the rotational speed of the propulsor shaft 45 and, thus, the propulsor 38 relative to the LP shaft 36. The power gearbox assembly 46 also includes one or more power gearbox bearings for supporting rotation of one or more of the plurality of power gearbox gears, as detailed further below.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the core turbine engine 16. The nacelle 50 is supported relative to the core turbine engine 16 by a plurality of outlet guide vanes 52 that are circumferentially spaced about the nacelle 50 and the core turbine engine 16. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the propulsor section 14. As the volume of air 58 passes across the propulsor blades 40, a first portion of the air, referred to as bypass air 62, is directed or is routed into the bypass airflow passage 56, and a second portion of air, referred to as core air 64, is directed or is routed into the upstream section of the core air flow path, or, more specifically, into the annular inlet 20 of the LP compressor 22. The ratio between the bypass air 62 and the core air 64 is commonly known as a bypass ratio. The pressure of the core air 64 is then increased, generating compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the propulsor 38 via the power gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

A controller 79 is in communication with the turbine engine 10 for controlling aspects of the turbine engine 10. For example, the controller 79 is in two-way communication with the turbine engine 10 for receiving signals from various sensors and control systems of the turbine engine 10, and for controlling components of the turbine engine 10, as detailed further below. The controller 79, or components thereof, may be located onboard the turbine engine 10, onboard the aircraft (not shown), or can be located remote from each of the turbine engine 10 and the aircraft. The controller 79 can be a Full Authority Digital Engine Control (FADEC) that controls aspects of the turbine engine 10.

The controller 79 may be a standalone controller or may be part of an engine controller to operate various systems of the turbine engine 10. In this embodiment, the controller 79 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 79 to perform operations. The controller 79 and, more specifically, the one or more processors are programmed or configured to perform these operations, such as the operations discussed further below. In some embodiments, the instructions can be executed by the one or more processors to cause the one or more processors to complete any of the operations and functions for which the controller 79 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a wide variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2A:
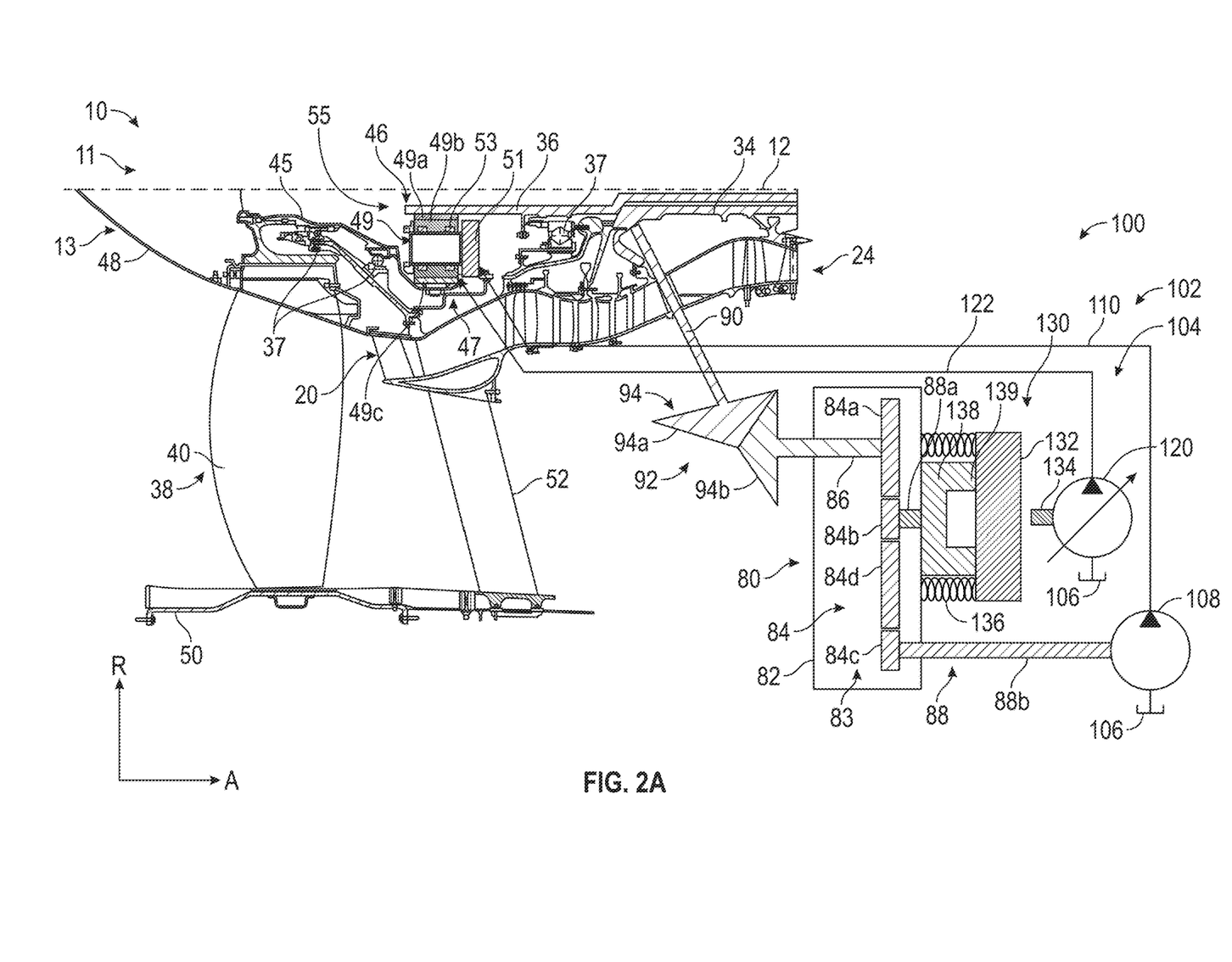
FIG. 2A is a detailed schematic cross-sectional view of a portion of the turbine engine, taken at detail 2 in FIG. 1, with a lubrication system having an auxiliary lubrication system in an inactive state, according to the present disclosure.
Figure 2B:
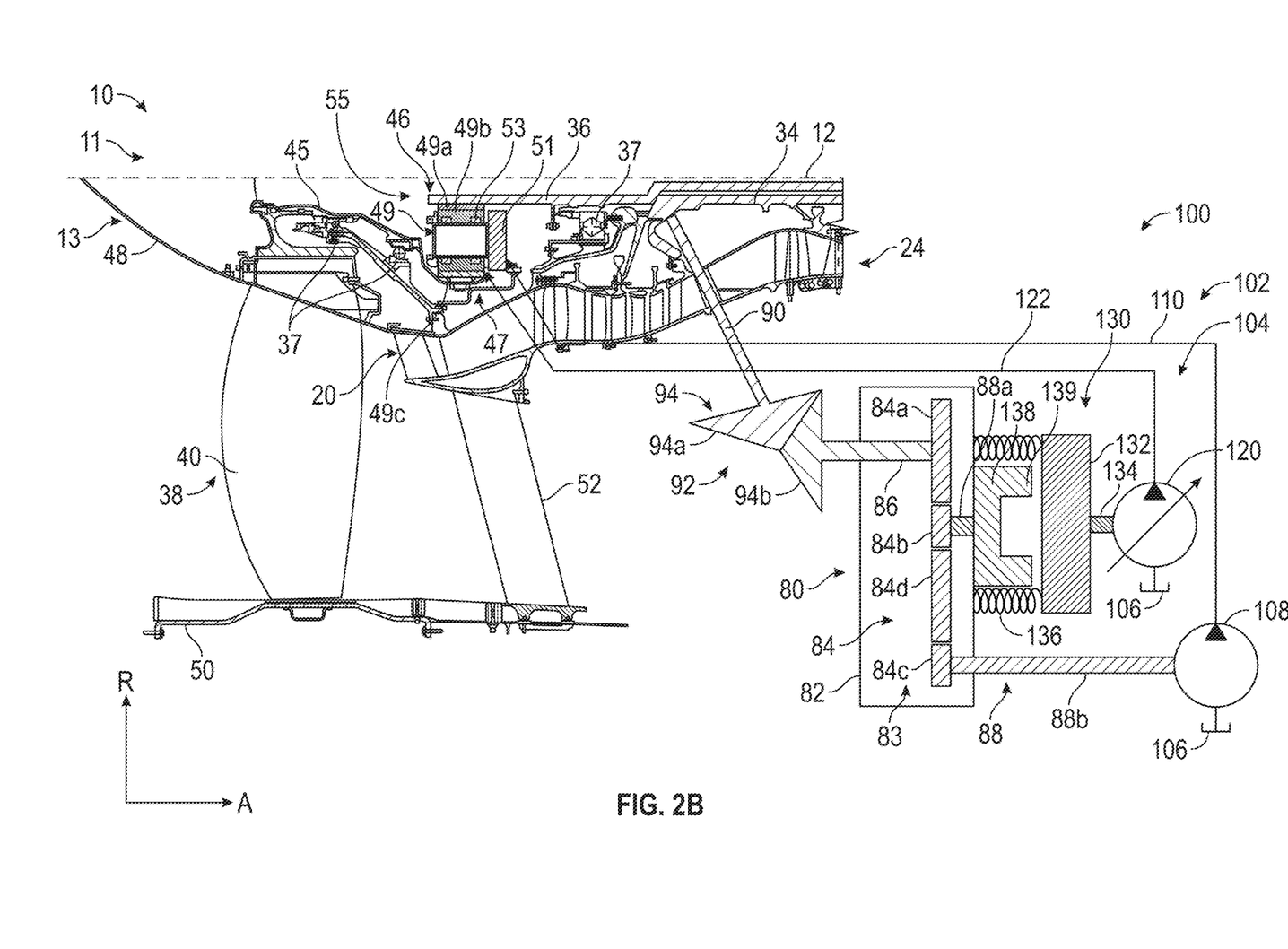
FIG. 2B is a detailed schematic cross-sectional view of the portion of the turbine engine 10, taken at detail 2 in FIG. 1, with the auxiliary lubrication system in an active state, according to the present disclosure.

FIG. 2A is a detailed schematic cross-sectional view of a portion of the turbine engine 10, taken at detail 2 in FIG. 1, with a lubrication system 100 having an auxiliary lubrication system 104 in an inactive state, according to the present disclosure. FIG. 2B is a detailed schematic cross-sectional view of the portion of the turbine engine 10, taken at detail 2 in FIG. 1, with the auxiliary lubrication system 104 in an active state, according to the present disclosure. As shown in FIGS. 2A and 2B, the turbine engine 10 includes one or more engine bearings 37 that support rotation of the LP shaft 36 and the propulsor shaft 45. The one or more engine bearings 37 can also support rotation of the HP shaft 34. The one or more engine bearings 37 can include any number of engine bearings 37 for supporting rotation of the shafts of the turbine engine 10. The one or more engine bearings 37 are referred to as rotating components of the turbine engine 10, and can include any type of bearing, such as, for example, journal bearings, roller bearings, or the like.

The power gearbox assembly 46 includes a power gearbox gear assembly 47 having a plurality of power gearbox gears 49. The plurality of power gearbox gears 49 includes a first power gearbox gear 49a, one or more second power gearbox gears 49b secured by a planet carrier 51, and a third power gearbox gear 49c. In FIGS. 2A and 2B, the first power gearbox gear 49a is a sun gear, the one or more second power gearbox gears 49b are planet gears, and the third power gearbox gear 49c is a ring gear. The power gearbox gear assembly 47 can be an epicyclic gear assembly. When the power gearbox gear assembly 47 is an epicyclic gear assembly, the one or more second power gearbox gears 49b include a plurality of second power gearbox gears 49b (e.g., two or more second power gearbox gears 49b).

In the epicyclic gear assembly, the power gearbox gear assembly 47 can be in a star arrangement or a rotating ring gear type gear assembly (e.g., the third power gearbox gear 49c is rotating and the planet carrier 51 is fixed and stationary). In such an arrangement, the propulsor 38 is driven by the third power gearbox gear 49c. For example, the third power gearbox gear 49c is coupled to the propulsor shaft 45 such that rotation of the third power gearbox gear 49c causes the propulsor shaft 45, and, thus, the propulsor 38, to rotate. In this way, the third power gearbox gear 49c is an output of the power gearbox gear assembly 47. However, other suitable types of gear assemblies may be employed. In one non-limiting embodiment, the power gearbox gear assembly 47 is a planetary arrangement, in which the third power gearbox gear 49c is held fixed, with the planet carrier 51 allowed to rotate. In such an arrangement, the propulsor 38 is driven by the planet carrier 51. For example, the planet carrier 51 is coupled to the propulsor shaft 45 such that rotation of the planet carrier 51 causes the propulsor shaft 45, and, thus, the propulsor 38, to rotate. In this way, the one or more second power gearbox gears 49b (e.g., via the planet carrier 51) are the output of the power gearbox gear assembly 47. In another non-limiting embodiment, the power gearbox gear assembly 47 may be a differential gear assembly in which the third power gearbox gear 49c and the planet carrier 51 are both allowed to rotate. While an epicyclic gear assembly 47 is detailed herein, the power gearbox gear assembly 47 can include any type of gear assembly including, for example, a compound gear assembly, a multiple stage gear assembly, or the like.

The plurality of power gearbox gears 49 includes one or more power gearbox bearings 53 disposed therein. For example, the one or more second power gearbox gears 49b each includes one or more power gearbox bearings 53 disposed therein. The one or more power gearbox bearings 53 enable the plurality of power gearbox gears 49 to rotate about the one or more power gearbox bearings 53 such that the plurality of power gearbox gears 49 rotates. The one or more power gearbox bearings 53 can include any type of bearing for a gear, such as, for example, journal bearings, roller bearings, or the like. The plurality of power gearbox gears 49 and the one or more power gearbox bearings 53 are rotating components of the turbine engine 10. Accordingly, the turbine engine 10 includes one or more rotating components 55 that includes at least one of the one or more engine bearings 37, the plurality of power gearbox gears 49, or the one or more power gearbox bearings 53. The one or more rotating components 55 can also include the HP shaft 34 or the LP shaft 36.

The first power gearbox gear 49a is coupled to an input shaft of the turbine engine 10. For example, the first power gearbox gear 49a is coupled to the LP shaft 36 such that rotation of the LP shaft 36 causes the first power gearbox gear 49a to rotate. Radially outward of the first power gearbox gear 49a, and intermeshing therewith, is the one or more second power gearbox gears 49b that are coupled together and supported by the planet carrier 51. The planet carrier 51 supports and constrains the one or more second power gearbox gears 49b such that the each of the one or more second power gearbox gears 49b is enabled to rotate about a corresponding axis of each second power gearbox gear 49b without rotating about the periphery of the first power gearbox gear 49a. Radially outwardly of the one or more second power gearbox gears 49b, and intermeshing therewith, is the third power gearbox gear 49c, which is an annular ring gear. The third power gearbox gear 49c is coupled via an output shaft to the propulsor 38 and rotates to drive rotation of the propulsor 38 about the longitudinal centerline axis 12. For example, the propulsor shaft 45 is coupled to the third power gearbox gear 49c.

The turbine engine 10 includes an accessory gearbox assembly 80. One or more accessories for the turbine engine 10 or the aircraft can be coupled to the accessory gearbox assembly 80 for powering the one or more accessories. As shown in FIGS. 2A and 2B, the accessory gearbox assembly 80 includes an accessory gearbox housing 82 and an accessory gearbox gear assembly 83 including a plurality of accessory gearbox gears 84. The accessory gearbox gear assembly 83 is disposed within the accessory gearbox housing 82. The plurality of accessory gearbox gears 84 includes a first accessory gearbox gear 84a, a second accessory gearbox gear 84b, a third accessory gearbox gear 84c, and a fourth accessory gearbox gear 84d. The plurality of accessory gearbox gears 84 can include any number of gears, as desired, and can include any type of gear, such as, for example, spur gears, bevel gears, compound gears, or the like.

The accessory gearbox assembly 80 includes an accessory gearbox input shaft 86 and one or more output shafts 88. The accessory gearbox input shaft 86 is coupled to one of the plurality of accessory gearbox gears 84 to cause the plurality of accessory gearbox gears 84 to rotate, as detailed further below. In FIGS. 2A and 2B, the accessory gearbox input shaft 86 is coupled to the first accessory gearbox gear 84a. In this way, rotation of the accessory gearbox input shaft 86 causes the first accessory gearbox gear 84a to rotate. The second accessory gearbox gear 84b intermeshes with the first accessory gearbox gear 84a. The fourth accessory gearbox gear 84d intermeshes with the second accessory gearbox gear 84b. The third accessory gearbox gear 84c intermeshes with the fourth accessory gearbox gear 84d. In some embodiments, the fourth accessory gearbox gear 84d is omitted and the third accessory gearbox gear 84c intermeshes with the second accessory gearbox gear 84b.

The one or more output shafts 88 are coupled to at least one of the plurality of accessory gearbox gears 84 such that rotation of the plurality of accessory gearbox gears 84 causes the one or more output shafts 88 to rotate. In FIGS. 2A and 2B, the one or more output shafts 88 include a first output shaft 88a and a second output shaft 88b. The first output shaft 88a is coupled to the second accessory gearbox gear 84b, and the second output shaft 88b is coupled to the third accessory gearbox gear 84c. The one or more rotating components 55 can include the one or more accessory gearbox gears 84, one or more accessory gearbox bearings of the accessory gearbox, or the accessory gearbox input shaft 86, or the one or more accessory gearbox output shafts 88.

The gear ratio of the accessory gearbox gear assembly 83 is greater than 3:1 such that the accessory gearbox gear assembly 83 increases the rotational speed of the one or more output shafts 88 from the accessory gearbox input shaft 86 by at least three times. For example, the second accessory gearbox gear 84b and the third accessory gearbox gear 84c are smaller than the first accessory gearbox gear 84a such that the second accessory gearbox gear 84b and the third accessory gearbox gear 84c rotate at a greater rotational speed than the first accessory gearbox gear 84a. In this way, the one or more output shafts 88 rotate at a greater rotational speed than the accessory gearbox input shaft 86. Preferably, the gear ratio is in a range of 3:1 to 5:1.

The accessory gearbox assembly 80 is coupled to the HP shaft 34 via a towershaft 90 that extends from, and is rotatable with, the HP shaft 34. In some embodiments, the accessory gearbox assembly 80 is coupled to the LP shaft 36. In FIGS. 2A and 2B, the towershaft 90 is generally extended at least partially along the radial direction R from the HP shaft 34. The towershaft 90 may extend at an acute angle relative to the longitudinal centerline axis 12, such as shown in FIGS. 2A and 2B. In some embodiments, the towershaft 90 can extend generally perpendicular to the HP shaft 34. The towershaft 90 can be coupled to the HP shaft 34 by a plurality of gears. The towershaft 90 is coupled to the accessory gearbox input shaft 86 by a towershaft gear assembly 92 having a plurality of towershaft gears 94. The plurality of towershaft gears 94 can be bevel gears, or the like. The plurality of towershaft gears 94 includes a first towershaft gear 94a coupled to the towershaft 90 and a second towershaft gear 94b coupled to the accessory gearbox input shaft 86. The first towershaft gear 94a intermeshes with the second towershaft gear 94b such that rotation of the towershaft 90 causes the accessory gearbox input shaft 86 to rotate. In this way, the towershaft 90 transmits mechanical energy from the HP shaft 34 to the one or more output shafts 88 through the accessory gearbox assembly 80, as detailed further below. The one or more rotating components 55 can include the towershaft 90 or the plurality of towershaft gears 84.

The turbine engine 10 includes the lubrication system 100, including a primary lubrication system 102, the auxiliary lubrication system 104, and a sump 106. The sump 106 (shown schematically in FIGS. 2A and 2B) is a reservoir that collects and stores lubricant therein. In some embodiments, the lubrication system 100 can include one or more tanks that store the lubricant therein. Preferably, the lubricant is oil. The lubricant can be any type of lubricant for lubricating the one or more rotating components 55 of the turbine engine 10 (e.g., the plurality of power gearbox gears 49 or the one or more power gearbox bearings 53).

The primary lubrication system 102 includes a primary pump 108 and a primary lubricant supply line 110. The primary pump 108 is in fluid communication with the sump 106 and the primary lubricant supply line 110. The primary lubricant supply line 110 is in fluid communication with the one or more rotating components 55 of the turbine engine 10. The primary pump 108 pumps the lubricant from the sump 106 to the one or more rotating components 55 through the primary lubricant supply line 110 for supplying the lubricant to the one or more rotating components 55, as detailed further below. In some embodiments, the primary pump 108 is a mechanical pump. For example, the primary pump 108 is coupled to, and powered by, the accessory gearbox assembly 80. The primary pump 108 is coupled to the second output shaft 88*b* such that rotation of the second output shaft 88*b* powers the primary pump 108. In this way, the second output shaft 88*b* is a primary pump shaft of the primary pump 108. In some embodiments, the primary lubrication system 102 supplies the lubricant from the sump 106 to the one or more rotating components 55 without a pump, for example, by gravity or by centrifugal force due to rotation of the planet carrier 51 in the planetary arrangement of the power gearbox gear assembly 47.

The sump 106 is in fluid communication with the one or more rotating components 55 such that the lubricant drains from the one or more rotating components 55 to the sump 106, for example, through a scavenge line (not shown in FIGS. 2A and 2B for clarity). In some embodiments, the lubrication system 100 includes a sump pump in fluid communication with the primary lubrication system 102 and the auxiliary lubrication system 104. The sump pump pumps the lubricant from the sump 106 to the primary lubrication system 102 or the auxiliary lubrication system 104.

The auxiliary lubrication system 104 includes an auxiliary pump 120 and an auxiliary lubricant supply line 122. The auxiliary lubricant supply line 122 is in fluid communication with the sump 106 and the one or more rotating components 55. While the auxiliary lubricant supply line 122 is depicted as being in fluid communication with the power gearbox assembly 46 in FIGS. 2A and 2B, the auxiliary lubricant supply line 122 can be in fluid communication with any of the one or more rotating components 55 of the turbine engine 10. Further, while the auxiliary lubricant supply line 122 is depicted as a separate flow line as the primary lubricant supply line 110 in FIGS. 2A and 2B, the auxiliary lubricant supply line 122 can form a part of the primary lubricant supply line 110. The auxiliary pump 120 is in fluid communication with the sump 106 and the auxiliary lubricant supply line 122. The auxiliary pump 120 is a mechanical pump that is powered by kinetic energy when the auxiliary lubrication system 104 is active, as detailed further below. The auxiliary pump 120 is a variable displacement pump such that the displacement, or the amount, of lubricant pumped per revolution of an input shaft of the auxiliary pump 120 is varied while the auxiliary pump 120 is running. In this way, the output of the amount of the lubricant from the auxiliary pump 120 remains substantially constant as the rotational speed of input shaft of the auxiliary pump 120 decreases, as detailed further below.

The lubrication system 100 includes a kinetic energy storage system 130 that stores kinetic energy and releases the kinetic energy to power the auxiliary lubrication system 104, as detailed further below. The kinetic energy storage system 130 includes a flywheel 132 and an auxiliary pump shaft 134 that provides input power for the auxiliary pump 120. The flywheel 132 is a mechanical device that converts angular momentum to store kinetic energy (in the form of rotational energy) as the flywheel 132 rotates. For example, the flywheel 132 has a high angular momentum such that the flywheel 132 tends to keep spinning even after a rotational input (e.g., the one or more output shafts 88 of the accessory gearbox assembly 80) has been removed. In this way, the flywheel 132 stores kinetic energy as the one or more output shafts 88 rotate the flywheel 132. In one non-limiting example, the flywheel 132 rotates at a maximum rotational speed in a range of twenty thousand rotations per minute to sixty-five thousand rotations per minute (20,000 RPM to 65,000 RPM).

The kinetic energy storage system 130 includes one or more flywheel springs 136 and a clutch 138. The one or more flywheel springs 136 are coupled to the flywheel 132 and to a static component. In FIGS. 2A and 2B, the static component is the accessory gearbox housing 82 of the accessory gearbox assembly 80 such that the one or more flywheel springs 136 are coupled to the accessory gearbox housing 82. The one or more flywheel springs 136 bias the flywheel 132 towards the auxiliary pump shaft 134 such that the flywheel 132 engages the auxiliary pump shaft 134 when the auxiliary lubrication system 104 is active, as detailed further below.

The clutch 138 is drivingly coupled to the accessory gearbox assembly 80. The clutch 138 is coupled to the one or more output shafts 88. In particular, the clutch 138 is coupled to the first output shaft 88*a* such that rotation of the first output shaft 88*a* causes the clutch 138 to rotate. The clutch 138 is an electromagnetic clutch that includes one or more magnets 139 that engage the flywheel 132 (as shown in FIG. 2A) when the auxiliary lubrication system 104 is inactive. In this way, rotation of the clutch 138 causes the flywheel 132 to rotate. The controller 79 (FIG. 1) is in communication with the clutch 138 to engage (FIG. 2A) or to disengage (FIG. 2B) the flywheel 132, as detailed further below.

In operation, the LP shaft 36 rotates, as detailed above, and causes the first power gearbox gear 49*a* to rotate. The first power gearbox gear 49*a*, being intermeshed with the one or more second power gearbox gears 49*b*, causes the one or more second power gearbox gears 49*b* to rotate about their corresponding axis of rotation. The one or more second power gearbox gears 49*b* rotate with respect to the one or more power gearbox bearings 53 within the planet carrier 51. When the power gearbox gear assembly 47 is the star arrangement, the one or more second power gearbox gears 49*b*, being intermeshed with the third power gearbox gear 49*c*, cause the third power gearbox gear 49*c* to rotate about the longitudinal centerline axis 12. In such embodiments, the planet carrier 51 remains stationary such that the one or more second power gearbox gears 49*b* do not rotate about the longitudinal centerline axis 12. When the power gearbox gear assembly 47 is the planetary arrangement, the third power gearbox gear 49c is stationary in the planet carrier 51, and the one or more second power gearbox gears 49b rotate about the longitudinal centerline axis 12. When the power gearbox gear assembly 47 is the differential gear assembly, both the planet carrier 51 (e.g., the one or more second power gearbox gears 49b) and the third power gearbox gear 49c rotate about the longitudinal centerline axis 12. In this way, the one or more rotating components 55 rotate.

At the same time, the HP shaft 34 rotates and causes the towershaft 90 to rotate, thereby causing the accessory gearbox input shaft 86 and the plurality of accessory gearbox gears 84 of the accessory gearbox gear assembly 83 to rotate. The rotation of the plurality of accessory gearbox gears 84 causes the one or more output shafts 88 to rotate. In particular, the rotation of the plurality of accessory gearbox gears 84 causes the second output shaft 88b to rotate, thereby powering the primary pump 108. In this way, the primary lubrication system 102 supplies the lubricant to the one or more rotating components 55 to lubricate the one or more rotating components 55. During normal operation of the turbine engine 10, the primary pump 108 pumps the lubricant from the sump 106 and to the one or more rotating components 55 through the primary lubricant supply line 110. The primary lubrication system 102 supplies the lubricant to the one or more rotating components 55. The lubricant drains from the one or more rotating components 55 and into the sump 106. During the normal operation of the turbine engine 10, the lubricant in the sump 106 is returned through the primary lubrication system 102 such that the primary lubrication system 102 continuously supplies the lubricant to the one or more rotating components 55. In this way, the lubricant can be re-used to lubricate the one or more rotating components 55.

The auxiliary lubrication system 104 is inactive when the primary lubrication system 102 is active, such as when the turbine engine 10 is operating under normal operation. When the auxiliary lubrication system 104 is inactive (FIG. 2A), the clutch 138 engages the flywheel 132 such that the flywheel 132 is disengaged from the auxiliary pump 120. In this way, the auxiliary pump 120 is prevented from pumping the lubricant while the auxiliary lubrication system 104 is inactive. The force of the one or more magnets 139 of the clutch 138 is greater than the force of the one or more flywheel springs 136 such that the clutch 138 overcomes the biasing force of the one or more flywheel springs 136 to pull the flywheel 132 away from the auxiliary pump 120 such the flywheel 132 does not engage the auxiliary pump 120. The controller 79 (FIG. 1) controls the clutch 138 to engage the flywheel 132. In some embodiments, the controller 79 controls the clutch 138 to engage the flywheel 132 by providing an electrical signal to the clutch 138. In some embodiments, the controller 79 controls the clutch 138 to engage the flywheel 132 based on a rotational speed of at least one of the HP shaft 34, the LP shaft 36, or the propulsor shaft 45. For example, the controller 79 controls the clutch 138 to engage the flywheel 132 when the rotational speed of the at least one of the HP shaft 34, the LP shaft 36, or the propulsor shaft 45 is greater than a rotational speed threshold. In some embodiments, the clutch 138 engages the flywheel 132 based on a pressure of the lubricant in the primary lubrication system 102. For example, the clutch 138 engages the flywheel 132 when the pressure of the lubricant in the primary lubrication system 102 is greater than a primary pressure threshold.

When the clutch 138 engages the flywheel 132, the accessory gearbox assembly 80 causes the flywheel 132 to rotate. For example, the rotation from the HP shaft 34 causes the towershaft 90 to rotate, thereby causing the accessory gearbox input shaft 86 and the plurality of accessory gearbox gears 84 to rotate. The rotation of the plurality of accessory gearbox gears 84 causes the one or more output shafts 88 to rotate, thereby causing the clutch 138 and the flywheel 132 to rotate. As the flywheel 132 rotates, the flywheel 132 stores kinetic energy, referred to as stored kinetic energy, in the flywheel 132 as angular momentum. In this way, the flywheel 132 will tend to continue to rotate after the clutch 138 disengages the flywheel 132. For example, the flywheel 132 will continue to rotate when the flywheel 132 is no longer being rotated by the accessory gearbox assembly 80.

In some instances, the primary lubrication system 102 may be unable to provide the lubricant to the one or more rotating components 55. For example, the primary lubrication system 102 may be unable to pressurize the lubricant to supply the lubricant to the one or more rotating components 55 during windmilling, while the turbine engine 10 is shut down, or during a failure of the turbine engine 10 or a failure of the primary lubrication system 102 (e.g., the primary pump 108) while in-flight. In such instances, the windmilling may cause the shafts (e.g., the propulsor shaft 45, the HP shaft 34, and the LP shaft 36) of the turbine engine 10 to rotate, thereby causing the one or more rotating components 55 to continue to rotate. As mentioned above, the one or more rotating components 55 (e.g., the plurality of power gearbox gears 49 or the one or more power gearbox bearings 53) can become damaged if there is not enough lubricant supplied to the one or more rotating components 55.

Accordingly, during such instances, the auxiliary lubrication system 104 activates to supply the lubricant to the one or more rotating components 55, as shown in FIG. 2B. The clutch 138 disengages the flywheel 132 such that the flywheel 132 engages the auxiliary pump shaft 134 (as shown in FIG. 2B) to power the auxiliary pump 120. For example, when the clutch 138 disengages the flywheel 132, the one or more flywheel springs 136 bias the flywheel 132 towards the auxiliary pump 120 to engage the auxiliary pump shaft 134. As detailed above, the flywheel 132 continues to rotate when the flywheel 132 is disengaged from the accessory gearbox assembly 80. When the flywheel 132 engages the auxiliary pump shaft 134, the rotation of the flywheel 132 causes the auxiliary pump shaft 134 to rotate, thereby powering the auxiliary pump 120. In this way, the flywheel 132 releases the stored kinetic energy to power the auxiliary pump 120. The auxiliary pump 120 pumps the lubricant from the sump 106 to the one or more rotating components 55 through the auxiliary lubricant supply line 122. In this way, the auxiliary lubrication system 104 supplies the lubricant to the one or more rotating components 55 when the primary lubrication system 102 is unable to supply the lubricant to the one or more rotating components 55. The lubricant drains from the one or more rotating components 55 and into the sump 106. While the auxiliary lubrication system 104 is active, the lubricant in the sump 106 is returned through the auxiliary lubrication system 104 such that the auxiliary lubrication system 104 continuously supplies the lubricant to the one or more rotating components 55 while the kinetic energy storage system 130 is releasing the stored kinetic energy.

When the flywheel 132 engages the auxiliary pump 120, the flywheel 132 rotates at a high rotational speed (e.g., 20,000 RPM to 65,000 RPM). In this way, the kinetic energy stored by the flywheel 132 is transferred to the auxiliary pump 120 (e.g., through the auxiliary pump shaft 134) to power the auxiliary pump 120. In such conditions, the displacement of the auxiliary pump 120 is low such that the auxiliary pump 120 pumps the lubricant at a particular output amount. As the flywheel 132 continues to rotate, rotational speed of the flywheel 132 decreases such that the kinetic energy stored in the flywheel 132 dissipates over time. To account for the decrease in rotational speed of the flywheel 132, the auxiliary pump 120 increases the displacement of the lubricant to maintain the lubricant output substantially constant even as the rotational speed of the flywheel 132 decreases. In this way, the auxiliary pump 120 supplies the lubricant at a substantially constant mass flow rate as the kinetic energy stored in the flywheel 132 dissipates. Such a configuration prevents the auxiliary pump 120 from supplying too much lubricant to the one or more rotating components 55 when the flywheel 132 initially engages the auxiliary pump 120 and from supplying too little lubricant to the one or more rotating components 55 as the flywheel 132 continues to rotate and the kinetic energy dissipates (e.g., when there is less power being supplied to the auxiliary pump 120).

The controller 79 (FIG. 1) controls the clutch 138 to disengage the flywheel 132 from the accessory gearbox assembly 80. In some embodiments, the clutch 138 disengages the flywheel 132 when the clutch 138 is not receiving an electrical signal from the controller 79. In some embodiments, the controller 79 controls the clutch 138 to disengage the flywheel 132 based on the rotational speed of at least one of the HP shaft 34, the LP shaft 36, or the propulsor shaft 45. For example, the controller 79 controls the clutch 138 to disengage the flywheel 132 when the rotational speed of the at least one of the HP shaft 34, the LP shaft 36, or the propulsor shaft 45 is less than the rotational speed threshold. In some embodiments, the controller 79 controls the clutch 138 to disengage the flywheel 132 based on the pressure of the lubricant in the primary lubrication system 102. For example, the controller 79 controls the clutch 138 to disengage the flywheel 132 when the pressure of the lubricant in the primary lubrication system 102 is less than the primary pressure threshold. In this way, the clutch 138 disengages the flywheel 132 such that the flywheel 132 engages the auxiliary pump 120 to power the auxiliary pump 120 when the auxiliary lubrication system 104 is activated.

Figure 3:
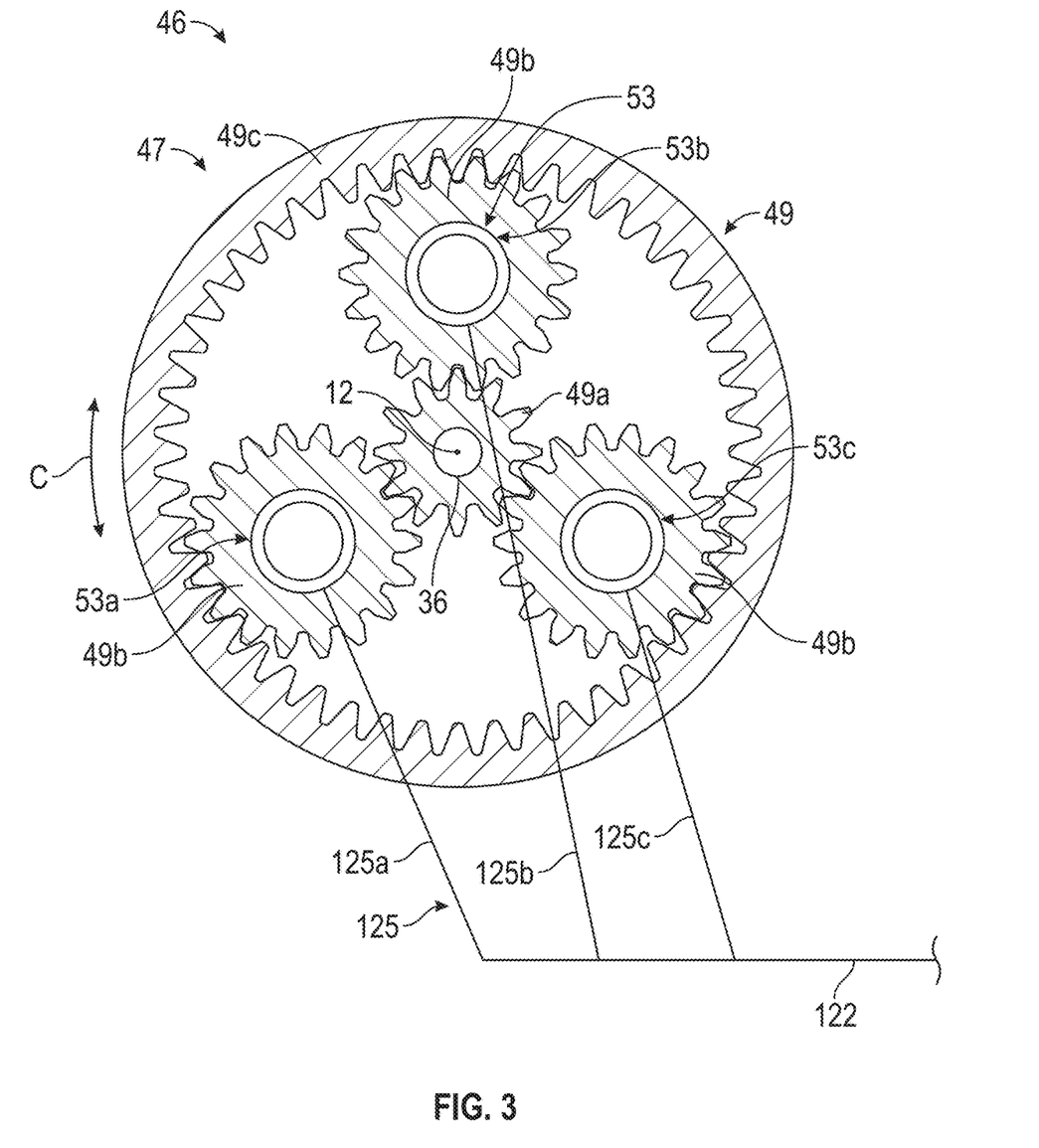
FIG. 3 is a schematic cross-sectional diagram of a power gearbox assembly for the turbine engine of FIG. 1, taken along a latitudinal centerline axis of the power gearbox assembly, according to the present disclosure.

FIG. 3 is a schematic cross-sectional diagram of the power gearbox assembly 46 for the turbine engine 10 (FIG. 1), taken along a latitudinal centerline axis of the power gearbox assembly 46, according to the present disclosure. As shown in FIG. 3, the one or more second power gearbox gears 49b include three second power gearbox gears 49b. The one or more second power gearbox gears 49b, however, can include any number of second power gearbox gears 49b, as desired. Each second power gearbox gear 49b has a respective power gearbox bearing 53 associated therewith such that there are three power gearbox bearings 53. For example, the one or more power gearbox bearings 53 include a first power gearbox bearing 53a, a second power gearbox bearing 53b, and a third power gearbox bearing 53c.

The auxiliary lubricant supply line 122 includes one or more lubricant branch lines 125 that are in fluid communication with the one or more power gearbox bearings 53. In this way, the lubrication system 100 (FIGS. 2A and 2B) supplies the lubricant directly to the one or more power gearbox bearings 53. For example, the one or more lubricant branch lines 125 include a first lubricant branch line 125a in fluid communication with the first power gearbox bearing 53a, a second lubricant branch line 125b in fluid communication with the second power gearbox bearing 53b, and a third lubricant branch line 125c in fluid communication with the third power gearbox bearing 53c. The lubricant flows from the auxiliary lubricant supply line 122 to the first power gearbox bearing 53a through the first lubricant branch line 125a. The lubricant flows from the auxiliary lubricant supply line 122 to the second power gearbox bearing 53b through the second lubricant branch line 125b. The lubricant flows from the auxiliary lubricant supply line 122 to the third power gearbox bearing 53c through the third lubricant branch line 125c. While the one or more lubricant branch lines 125 are depicted as being branch lines of the auxiliary lubricant supply line 122, the one or more lubricant branch lines 125 can be branch lines of the primary lubricant supply line 110 (FIGS. 2A and 2B) as well.

Accordingly, the auxiliary lubrication system 104 supplies the lubricant to the one or more rotating components 55 while the turbine engine 10 is shut down or is otherwise windmilling. The kinetic energy storage system 130 (FIGS. 2A and 2B) ensures that the auxiliary pump 120 (FIGS. 2A and 2B) operates to pump the lubricant to the one or more rotating components 55 independently of the rotational direction of the propulsor 38 (FIGS. 2A and 2B) during windmilling (e.g., whether the propulsor is rotating clockwise or counterclockwise). The kinetic energy storage system 130 also reduces complexity of the auxiliary lubrication system 104 (FIGS. 2A and 2B), as compared to auxiliary lubrication systems without the benefit of the present disclosure, by powering the auxiliary pump 120 independently of the rotation of the propulsor shaft 45 (FIGS. 2A and 2B) or rotation of other shafts of the turbine engine 10.

Further aspects of the present disclosure are provided by the subject matter of the following clauses.

A lubrication system for a turbine engine, the turbine engine including a propulsor and one or more rotating components, the lubrication system comprising a sump that stores lubricant therein, a primary lubrication system supplying the lubricant from the sump to the one or more rotating components during normal operation of the turbine engine, an auxiliary lubrication system comprising an auxiliary pump including an auxiliary pump shaft, and a kinetic energy storage system comprising a flywheel that engages the auxiliary pump shaft to power the auxiliary pump when the propulsor is windmilling such that the auxiliary pump pumps the lubricant from the sump to the one or more rotating components.

The lubrication system of any preceding clause, the auxiliary pump being a variable displacement pump that increases a displacement of the lubricant from the auxiliary pump as a rotational speed of the flywheel decreases.

The lubrication system of any preceding clause, the kinetic energy storage system further comprising a clutch that engages the flywheel during normal operation of the turbine engine such that rotation of the clutch causes the flywheel to rotate and to store kinetic energy.

The lubrication system of any preceding clause, the clutch disengaging the flywheel when the propulsor is windmilling such that the flywheel engages the auxiliary pump shaft and releases the stored kinetic energy to power the auxiliary pump.

The lubrication system of any preceding clause, the kinetic energy storage system further comprising one or more flywheel springs that bias the flywheel towards the auxiliary pump shaft when the propulsor is windmilling.

The lubrication system of any preceding clause, the clutch being an electromagnetic clutch that is controlled to engage the flywheel during normal operation of the turbine engine and to disengage the flywheel when the propulsor is windmilling.

The lubrication system of any preceding clause, the turbine engine further comprising an accessory gearbox assembly having a plurality of accessory gearbox gears, the flywheel being drivingly coupled to the plurality of accessory gearbox gears.

The lubrication system of any preceding clause, the turbine engine including a high-pressure shaft and a low-pressure shaft, and the plurality of accessory gearbox gears is drivingly coupled to at least one of the high-pressure shaft or the low-pressure shaft.

The lubrication system of any preceding clause, the primary lubrication system comprising a primary pump that pumps the lubricant from the sump to the one or more rotating components during normal operation of the turbine engine.

The lubrication system of any preceding clause, the primary pump being drivingly coupled to the plurality of accessory gearbox gears.

A method of operating the lubrication system of any preceding clause, the method comprising supplying the lubricant through the primary lubrication system to the one or more rotating components during normal operation of the turbine engine, activating the auxiliary lubrication system by engaging the flywheel with the auxiliary pump shaft when the propulsor is windmilling, the flywheel rotating to power the auxiliary pump, and pumping, with the auxiliary pump, the lubricant from the sump to the one or more rotating components when the flywheel is powering the auxiliary pump.

The method of any preceding clause, the auxiliary pump being a variable displacement pump, and the method further comprises increasing a displacement of the lubricant from the auxiliary pump as a rotational speed of the flywheel decreases.

The method of any preceding clause, the kinetic energy storage system further comprising a clutch, and the method further comprises engaging the flywheel with the clutch during normal operation of the turbine engine such that rotation of the clutch causes the flywheel to rotate and to store kinetic energy.

The method of any preceding clause, further comprising disengaging the flywheel with the clutch when the propulsor is windmilling, and engaging the flywheel with the auxiliary pump shaft when the flywheel is disengaged by the clutch such that the flywheel releases the stored kinetic energy to power the auxiliary pump.

The method of any preceding clause, the kinetic energy storage system further comprising one or more flywheel springs, and the method further comprises biasing the flywheel towards the auxiliary pump shaft with the one or more flywheel springs when the propulsor is windmilling.

The method of any preceding clause, the clutch being an electromagnetic clutch, and the method further comprises controlling the electromagnetic clutch to engage the flywheel during normal operation of the turbine engine and to disengage the flywheel when the propulsor is windmilling.

The method of any preceding clause, the turbine engine further comprising an accessory gearbox assembly having a plurality of accessory gearbox gears, and the method further comprises driving the flywheel with the plurality of accessory gearbox gears to rotate the flywheel during normal operation of the turbine engine.

The method of any preceding clause, the turbine engine including a high-pressure shaft and a low-pressure shaft, and the method further comprises driving the plurality of accessory gearbox gears by at least one of the high-pressure shaft or the low-pressure shaft.

The method of any preceding clause, the primary lubrication system comprising a primary pump, and the method further comprises pumping, with the primary pump, the lubricant from the sump to the one or more rotating components during normal operation of the turbine engine.

The method of any preceding clause, further comprising driving the primary pump with the plurality of accessory gearbox gears.

The lubrication system of any preceding clause, the turbine engine comprising a power gearbox assembly having a plurality of power gearbox gears.

The lubrication system of any preceding clause, the one or more rotating components being one or more power gearbox bearings of the power gearbox assembly.

The lubrication system of any preceding clause, the one or more power gearbox bearings being journal bearings.

The lubrication system of any preceding clause, the turbine engine further comprising a towershaft coupled to the at least one of the high-pressure shaft or the low-pressure shaft.

The lubrication system of any preceding clause, the accessory gearbox assembly further comprising an accessory gearbox input shaft and one or more output shafts.

The lubrication system of any preceding clause, the accessory gearbox input shaft being drivingly coupled to the towershaft.

The lubrication system of any preceding clause, the accessory gearbox input shaft being drivingly coupled to the towershaft by a towershaft gear assembly.

The lubrication system of any preceding clause, the accessory gearbox assembly having an accessory gearbox housing, the plurality of accessory gearbox gears being disposed within the accessory gearbox housing.

The lubrication system of any preceding clause, one or more flywheel springs being coupled to the accessory gearbox housing and to the flywheel.

The lubrication system of any preceding clause, the plurality of accessory gearbox gears including a first accessory gearbox gear, a second accessory gearbox gear, and a third accessory gearbox gear.

The lubrication system of any preceding clause, the accessory gearbox input shaft being coupled to the first accessory gearbox gear.

The lubrication system of any preceding clause, the one or more output shafts including a first output shaft coupled to the clutch.

The lubrication system of any preceding clause, the one or more output shafts including a second output shaft coupled to the primary pump.

The lubrication system of any preceding clause, the first output shaft being coupled to the second accessory gearbox gear.

The lubrication system of any preceding clause, the second output shaft being coupled to the third accessory gearbox gear.

The lubrication system of any preceding clause, the plurality of accessory gearbox gears further comprising a fourth accessory gearbox gear disposed between the second accessory gearbox gear and the third accessory gearbox gear.

The lubrication system of any preceding clause, the auxiliary lubrication system comprising an auxiliary lubricant supply line in fluid communication with the sump and the one or more rotating components.

The lubrication system of any preceding clause, the auxiliary lubricant supply line comprising one or more auxiliary lubricant branch lines, each of the one or more auxiliary lubricant branch lines being coupled to a different one of the one or more rotating components.

The lubrication system of any preceding clause, the primary lubrication system comprising a primary lubricant supply line in fluid communication with the sump and the one or more rotating components.

A turbine engine comprising a propulsor and a core turbine engine having a shaft, the propulsor being drivingly coupled to the shaft. The turbine engine comprises the lubrication system of any preceding clause.

The method of any preceding clause, the lubrication system being the lubrication system of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine, the turbine engine including a propulsor and one or more rotating components, the lubrication system comprising:
   a sump that stores lubricant therein;
   a primary lubrication system supplying the lubricant from the sump to the one or more rotating components during normal operation of the turbine engine;
   an auxiliary lubrication system comprising an auxiliary pump including an auxiliary pump shaft; and
   a kinetic energy storage system comprising a flywheel that engages the auxiliary pump shaft to power the auxiliary pump when the propulsor is windmilling such that the auxiliary pump pumps the lubricant from the sump to the one or more rotating components.

2. The lubrication system of claim 1, wherein the auxiliary pump is a variable displacement pump that increases a displacement of the lubricant from the auxiliary pump as a rotational speed of the flywheel decreases.

3. The lubrication system of claim 1, wherein the kinetic energy storage system further comprises a clutch that engages the flywheel during normal operation of the turbine engine such that rotation of the clutch causes the flywheel to rotate and to store kinetic energy.

4. The lubrication system of claim 3, wherein the clutch disengages the flywheel when the propulsor is windmilling such that the flywheel engages the auxiliary pump shaft and releases the stored kinetic energy to power the auxiliary pump.

5. The lubrication system of claim 4, wherein the kinetic energy storage system further comprises one or more flywheel springs that bias the flywheel towards the auxiliary pump shaft when the propulsor is windmilling.

6. The lubrication system of claim 4, wherein the clutch is an electromagnetic clutch that is controlled to engage the flywheel during normal operation of the turbine engine and to disengage the flywheel when the propulsor is windmilling.

7. The lubrication system of claim 1, wherein the turbine engine further comprises an accessory gearbox assembly having a plurality of accessory gearbox gears, the flywheel being drivingly coupled to the plurality of accessory gearbox gears.

8. The lubrication system of claim 7, wherein the turbine engine includes a high-pressure shaft and a low-pressure shaft, and the plurality of accessory gearbox gears is drivingly coupled to at least one of the high-pressure shaft or the low-pressure shaft.

9. The lubrication system of claim 7, wherein the primary lubrication system comprises a primary pump that pumps the lubricant from the sump to the one or more rotating components during normal operation of the turbine engine.

10. The lubrication system of claim 9, wherein the primary pump is drivingly coupled to the plurality of accessory gearbox gears.

11. A method of operating a lubrication system for a turbine engine, the method comprising:
    supplying a lubricant from a sump to one or more rotating components of the turbine engine during normal operation of the turbine engine using a primary lubrication system;
    activating an auxiliary lubrication system including an auxiliary pump having an auxiliary pump shaft by engaging a flywheel with the auxiliary pump shaft when a propulsor of the turbine engine is windmilling, the flywheel rotating to power the auxiliary pump; and
    pumping, with the auxiliary pump, the lubricant from the sump to the one or more rotating components when the flywheel is powering the auxiliary pump.

12. The method of claim 11, wherein the auxiliary pump is a variable displacement pump, and the method further comprises increasing a displacement of the lubricant from the auxiliary pump as a rotational speed of the flywheel decreases.

13. The method of claim 11, wherein a kinetic energy storage system includes a clutch and the flywheel, and the method further comprises engaging the flywheel with the clutch during normal operation of the turbine engine such that rotation of the clutch causes the flywheel to rotate and to store kinetic energy.

14. The method of claim 13, further comprising:
    disengaging the flywheel with the clutch when the propulsor is windmilling; and
    engaging the flywheel with the auxiliary pump shaft when the flywheel is disengaged by the clutch such that the flywheel releases the stored kinetic energy to power the auxiliary pump.

15. The method of claim 14, wherein the kinetic energy storage system includes one or more flywheel springs, and the method further comprises biasing the flywheel towards the auxiliary pump shaft with the one or more flywheel springs when the propulsor is windmilling.

16. The method of claim 14, wherein the clutch is an electromagnetic clutch, and the method further comprises controlling the electromagnetic clutch to engage the flywheel during normal operation of the turbine engine and to disengage the flywheel when the propulsor is windmilling.

17. The method of claim 11, wherein the turbine engine includes an accessory gearbox assembly having a plurality of accessory gearbox gears, and the method further comprises driving the flywheel with the plurality of accessory gearbox gears to rotate the flywheel during normal operation of the turbine engine.

18. The method of claim 17, wherein the turbine engine includes a high-pressure shaft and a low-pressure shaft, and the method further comprises driving the plurality of accessory gearbox gears by at least one of the high-pressure shaft or the low-pressure shaft.

19. The method of claim 17, wherein the primary lubrication system includes a primary pump, and the method further comprises pumping, with the primary pump, the lubricant from the sump to the one or more rotating components during normal operation of the turbine engine.

20. The method of claim 19, further comprising driving the primary pump with the plurality of accessory gearbox gears.

* * * * *